US012691513B2

(12) United States Patent
Klinger et al.

(10) Patent No.: US 12,691,513 B2
(45) Date of Patent: Jul. 28, 2026

(54) END-PROCESSING CENTER FOR ROD-SHAPED WORKPIECES

(71) Applicant: ASMAG-Holding GmbH, Grünau im Almtal (AT)

(72) Inventors: Christoph Karl Klinger, Scharnstein (AT); Simon Pirzl, Scharnstein (AT); Markus Pühringer, Scharnstein (AT); Roland Rathmayr, Scharnstein (AT)

(73) Assignee: ASMAG-Holding GmbH, Grünau im Almtal (AT)

( * ) Notice: Subject to any disclaimer, the term of this patent is extended or adjusted under 35 U.S.C. 154(b) by 288 days.

(21) Appl. No.: 18/709,922

(22) PCT Filed: Nov. 16, 2022

(86) PCT No.: PCT/AT2022/060401
§ 371 (c)(1),
(2) Date: Jun. 6, 2024

(87) PCT Pub. No.: WO2023/087043
PCT Pub. Date: May 25, 2023

(65) Prior Publication Data
US 2025/0010387 A1 Jan. 9, 2025

(30) Foreign Application Priority Data

Nov. 16, 2021 (AT) .............................. A 50917/2021

(51) Int. Cl.
*B23D 47/04* (2006.01)
*B23D 21/00* (2006.01)
(Continued)

(52) U.S. Cl.
CPC ........... *B23D 47/042* (2013.01); *B23D 21/00* (2013.01); *B23D 21/04* (2013.01); *B23D 45/00* (2013.01); *B23D 36/00* (2013.01)

(58) Field of Classification Search
CPC ...... B23D 47/042; B23D 21/00; B23D 21/04; B23D 45/00; B23D 36/00
See application file for complete search history.

(56) References Cited

U.S. PATENT DOCUMENTS

| | | | |
|---|---|---|---|
| 3,131,588 A | 5/1964 | McConnell | |
| 3,577,829 A * | 5/1971 | Hurn | B27B 27/00 83/13 |

(Continued)

FOREIGN PATENT DOCUMENTS

| | | |
|---|---|---|
| AU | 2008269432 B2 | 1/2014 |
| CN | 105750638 A | 7/2016 |

(Continued)

OTHER PUBLICATIONS

International Search Report in PCT/AT2022/060401, mailed Mar. 29, 2023.

*Primary Examiner* — Ryan J. Walters
(74) *Attorney, Agent, or Firm* — Collard & Roe, P.C.

(57) ABSTRACT

A system and a method process a first end and a second end of at least one rod-shaped workpiece. The system includes a conveying device for cross-conveying the at least one rod-shaped workpiece in a conveying direction, a first processing device and a second processing device. The first and the second processing devices each include a clamping device, a sawing device and at least one chamfering device, wherein, using the conveying device, the first end of the at least one rod-shaped workpiece can be supplied to the first processing device and the second end of the at least one rod-shaped workpiece can be supplied to the second processing device. The arrangement of the sawing device and the at least one chamfering device of each processing device has been chosen so as to achieve high efficiency in the (Continued)

Figure 1:
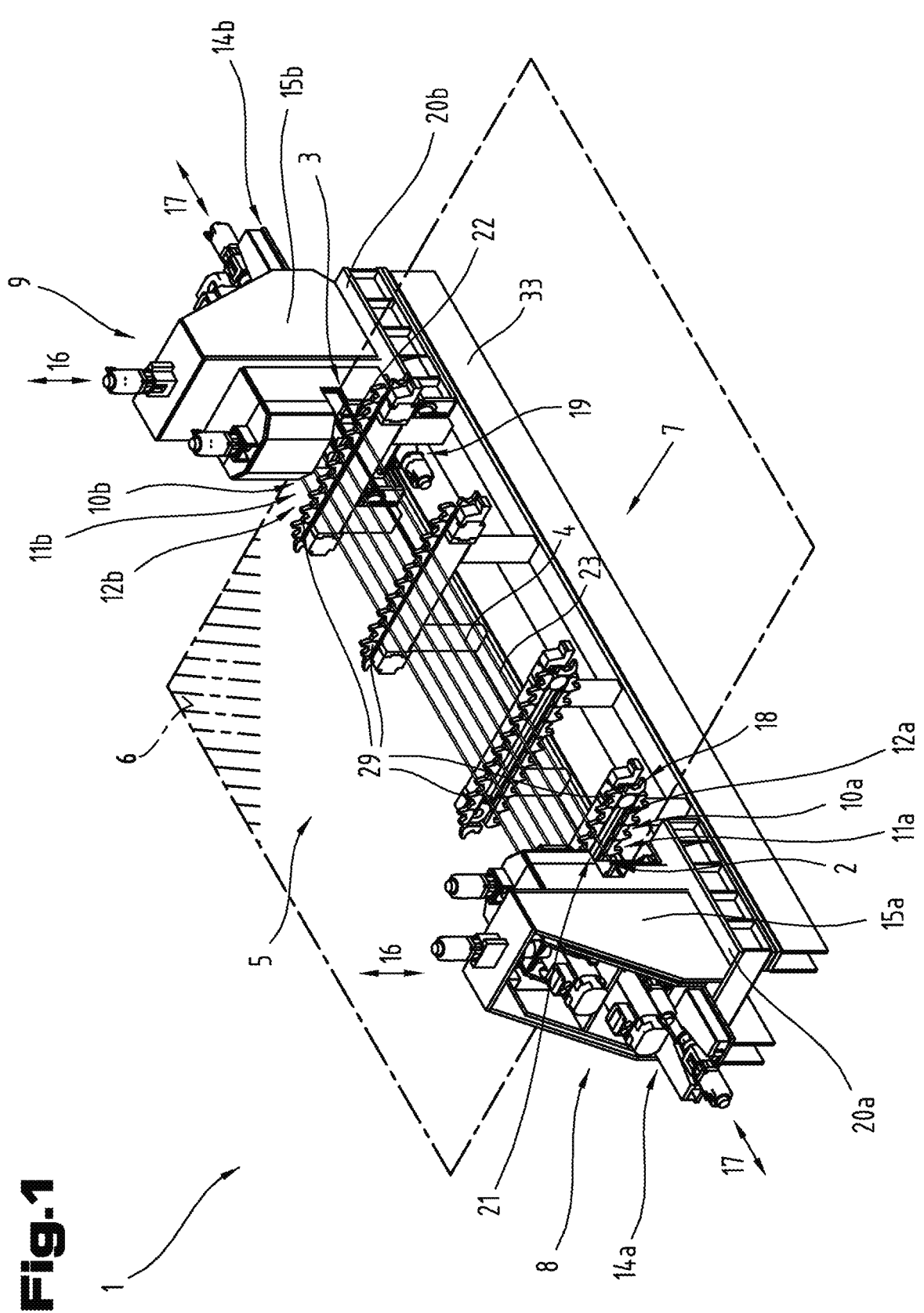

system, making particularly cost-effective processing of rod-shaped workpieces possible.

15 Claims, 6 Drawing Sheets

(51) Int. Cl.
    *B23D 21/04*         (2006.01)
    *B23D 45/00*         (2006.01)
    *B23D 36/00*         (2006.01)

(56)                 References Cited

U.S. PATENT DOCUMENTS

| | | | | |
|---|---|---|---|---|
| 3,810,404 | A * | 5/1974 | Stolzer | B23Q 7/10 |
| | | | | 83/520 |
| 4,425,062 | A | 1/1984 | Kawamura et al. | |
| 5,088,364 | A * | 2/1992 | Stolzer | B23D 47/042 |
| | | | | 83/277 |
| 5,148,907 | A * | 9/1992 | Tokiwa | B23Q 7/042 |
| | | | | 83/277 |
| 5,765,461 | A * | 6/1998 | Wang | B23D 21/00 |
| | | | | 83/468.6 |
| 6,638,150 | B2 * | 10/2003 | Walczak | B23Q 7/043 |
| | | | | 409/173 |
| 9,067,255 | B2 * | 6/2015 | Fries | B21F 1/00 |
| 9,522,452 | B2 * | 12/2016 | Rattunde | B24B 9/00 |
| 2002/0028642 | A1 | 3/2002 | Walczak et al. | |
| 2013/0260652 | A1 | 10/2013 | Rattunde | |

FOREIGN PATENT DOCUMENTS

| | | |
|---|---|---|
| EP | 0 338 015 B1 | 6/1991 |
| WO | 2017/124601 A1 | 7/2017 |

* cited by examiner

END-PROCESSING CENTER FOR ROD-SHAPED WORKPIECES

CROSS REFERENCE TO RELATED APPLICATIONS

This application is the National Stage of PCT/AT2022/060401 filed on Nov. 16, 2022, which claims priority under 35 U.S.C. § 119 of Austrian Application No. A50917/2021 filed on Nov. 16, 2021, the disclosure of which is incorporated by reference. The international application under PCT article 21 (2) was not published in English.

The invention relates to a system for processing the ends of at least one rod-shaped or tubular workpiece by means of two processing devices, each comprising a sawing device and at least one chamfering device, wherein the at least one rod-shaped or tubular workpiece is supplied to the processing devices by means of a conveying device in a conveying plane aligned transversely to the conveying direction. The present invention is characterized by a high processing accuracy of the rod-shaped or tubular workpieces to be processed and by a high processing speed during continuous processing of a plurality of rod-shaped or tubular workpieces.

A device for processing rod-shaped workpieces is described in U.S. Pat. No. 4,425,062A. Here, a rod is inserted between two processing devices via a supplying device and then the rod end is cut and processed in each processing device.

Furthermore, EP0338015B1 describes a method for cutting and deburring pipes, wherein the unprocessed pipe is held by means of supporting jaws for processing in order to cut and subsequently deburr the unprocessed pipe. However, both devices describe only a partially satisfactory technical solution with regard to the achievable processing accuracy and especially with regard to the processing speed during continuous processing of a plurality of rod-shaped or tubular workpieces.

The object of the present invention was to overcome the disadvantages of the prior art and to provide a device and a method by means of which a user is able to machine the ends of rod-shaped or tubular workpieces in a simple manner and with high finishing accuracy and at the same time short cycle times.

This object is achieved by a device and a method according to the claims.

The system according to the invention for processing a first end and a second end of at least one rod-shaped workpiece comprises a conveying device in which the at least one rod-shaped workpiece can be positioned in a conveying plane transversely to a conveying direction and by means of which conveying device the at least one rod-shaped workpiece can be conveyed in the conveying direction. Furthermore, the system comprises a first processing device and a second processing device, wherein the first end of the at least one rod-shaped workpiece can be supplied to the first processing device and the second end of the at least one rod-shaped workpiece can be supplied to the second processing device by means of the conveying device. The first processing device and the second processing device each are provided with a clamping device, a sawing device and at least one chamfering device. It may be advantageous for the sawing device and the at least one chamfering device of a processing device to be aligned with one another in such a way that the respective processing rotation axes are arranged within a joint plane.

In the first processing device and in the second processing device, the sawing device and a machine housing of the at least one chamfering device are each arranged on a joint support element and are held in a fixed position relative to the joint support element. Furthermore, in the first processing device and in the second processing device, a tool unit is formed, each consisting in the sawing device, the machine housing with the at least one chamfering device and the joint support element. The first tool unit of the first processing device is movable relative to a first machine frame and the second tool unit of the second processing device is movable relative to a second machine frame along a first processing direction aligned normal to the conveying plane and along a second processing direction aligned orthogonal to the conveying direction and parallel to the conveying plane.

Thus, if the ends of the at least one rod-shaped workpiece are supplied to the respective processing devices, these ends or the end regions of the rod-shaped workpieces can be machined by means of the tool unit in the state held by the clamping device. Advantageously, the tool unit can be moved in the direction of the first processing direction and in the direction of the second processing direction and thus the at least one rod-shaped workpiece can be cut off by means of the sawing unit and processed by means of the chamfering unit, wherein the clamping device is not released between the two processing steps. This results in a processability as simple as possible and a precise processing, as the at least one rod-shaped workpiece is always positioned in the correct position by means of the clamping device and thus simultaneously represents a reference mark for the movements of the tool unit. This also results in a saving in measuring technology for adjusting the at least one rod-shaped workpiece.

Furthermore, the system described here achieves a considerable reduction in the cycle time per supply and processing of a rod-shaped workpiece when processing a plurality of rod-shaped workpieces, and the tolerance of the processing is improved. On the one hand, this results from the fact that the at least one rod-shaped workpiece to be processed only needs to be clamped once for both operations. Secondly, the cycle time per rod-shaped workpiece to be processed is reduced, as the precise positioning of the rod-shaped workpiece by means of the clamping device in relation to the positional accuracy of the individual tools of the tool unit means that no additional measuring work is required, which would take time.

Another advantageous embodiment may provide that the conveying device, the first processing device and the second processing device are mounted on a joint baseframe, a processing rotation axis of the at least one chamfering device of the first processing device being aligned with a processing rotation axis of the at least one chamfering device of the second processing device.

It may be useful for the respective clamping device to be fixed in position on the respective processing device, wherein the first and second processing devices may be mounted on the joint baseframe at the same time. This ensures the correct positioning of the rod-shaped workpiece to be processed or rod-shaped workpieces to be processed in general. The alignment of the processing rotation axes of the chamfering devices of the first and second processing device subsequently ensures that the adjustment of the respective chamfering device by means of the respective movable tool unit is simplified and that a fast and precise processing is performed by means of the respective chamfering device.

In particular, it may be advantageous if the conveying device comprises a first conveying means and a second conveying means, which first conveying means is mounted on the first machine frame of the first processing device and which second conveying means is mounted on the second machine frame of the second processing device, wherein the first conveying means and the second conveying means are motion-coupled.

The supply in the conveying direction of the at least one rod-shaped workpiece can thus be ensured in a coordinated manner by the first conveying means and the second conveying means. It is thus avoidable that the at least one rod-shaped workpiece has an inclined position with respect to the aligned clamping devices or, subsequently, with respect to the aligned processing rotation axes when it is picked up by the respective clamping device and is subsequently fixed by clamping in the clamping devices. Thus it is ensured that the motion coupling of the first conveying means and the second conveying means positions the at least one rod-shaped workpiece or rod-shaped workpieces in the conveying device in the correct position, i.e. with its longitudinal axis aligned parallel to the first processing direction, and that the first end and the second end of the at least one rod-shaped workpiece are supplied simultaneously to the first and second processing devices respectively.

In addition, it may be provided that the respective clamping device is movable and positionable relative to the first and second machine frame of the respective first and second processing device along the first processing direction, a first end region and a second end region of the at least one rod-shaped workpiece being receivable or positionable in the respective clamping device of the first processing device and the second processing device. It may be advantageous that the first processing direction is aligned vertically and thus that the respective clamping device can be moved and positioned in a vertical direction.

This ensures that a geometrically known rod-shaped workpiece can be picked up and positioned by the clamping device in such a way that the processing positioning of the rod-shaped workpiece relative to the processing device is known. This results in the advantageous effect that there is no need to calibrate or determine the exact position in the direction of the first processing direction of the rod-shaped workpiece. This means that the tool unit can be used to start processing the at least one rod-shaped workpiece more quickly, which in turn reduces the cycle time when processing a plurality of rod-shaped workpieces. Similarly, the positioning of a rod-shaped workpiece along its longitudinal axis does not have to be determined and, if necessary, adapted, which would make it more difficult to determine the position of the rod-shaped workpiece in the direction of the first processing direction if it is misaligned. Saving on the corresponding measurement technology also brings economic benefits and a reduction in system complexity.

According to an advancement, it is possible that the respective tool unit of the first processing device and of the second processing device comprises, in addition to the at least one chamfering device, at least one second chamfering device with a second machine housing, the machine housings of the at least one chamfering device and of the at least one second chamfering device being arranged at a distance from one another on the joint support element along the conveying direction.

It is thus possible for the at least one first rod-shaped workpiece and a second rod-shaped workpiece to be processed simultaneously, or in one processing step, and with a single supply of the tool unit by means of the at least one first chamfering device and the second chamfering device. This reduces the cycle time when processing several rod-shaped workpieces.

In addition, it may be provided that the at least one chamfering device is movable and positionable in a motion-coupled manner relative to its machine housing and the second chamfering device is movable and positionable in a motion-coupled manner relative to its second machine housing in the direction along the second processing direction.

As a result, the cycle time can be further reduced when processing several rod-shaped workpieces, as the supply of the chamfering devices in the direction of the second processing direction is carried out on the one hand by the movement of the tool unit and on the other hand by the movement of the chamfering devices themselves. Furthermore, the tool unit also has to travel shorter distances, which produces energy advantages in terms of the mass to be accelerated with each movement.

In particular, it may be advantageous if the first end and the second end, or the first end portion and the second end portion, of the at least one first rod-shaped workpiece and of a second rod-shaped workpiece can be cut by means of the respective sawing device of the first processing device and of the second processing device when the tool unit moves along the first processing direction.

Thus, it is expedient if the sawing device is arranged relative to the clamping device in such a way that a line of a saw blade or a saw band projected onto the conveying plane covers the at least one rod-shaped workpiece and the second rod-shaped workpiece. This means that at least two rod-shaped workpieces can be cut simultaneously during a processing movement in the direction of the first processing direction. Again, this embodiment has the advantage of shortening the cycle time per machined rod-shaped workpiece and reducing the energy consumption due to the reduction of processing steps per two rod-shaped workpieces to be processed.

According to an advancement, it is possible that the clamping device of the first processing device and the clamping device of the second processing device each have a lower clamping jaw and an upper clamping jaw relative to the conveying plane, at least one workpiece holder with a V-shaped cross-section being formed in the lower clamping jaw for the at least one rod-shaped workpiece.

It is advantageous thus that the at least one rod-shaped workpiece, and in particular a rod-shaped workpiece with a round cross-section, can be positioned in a defined manner in the V-shaped workpiece holder relative to the conveying direction. The relative positions of the clamping device and thus of the lower and upper clamping jaws to the tool unit are known via the arrangement on the joint machine frame. As a result, the position of the rod-shaped workpiece relative to the tool unit is known when the rod-shaped workpiece is positioned in the V-shaped workpiece holder. This means that the at least one rod-shaped workpiece can be machined effectively and precisely, as no measuring technology is required to determine the positional accuracy of the rod-shaped workpiece.

An advantageous advancement may be that the upper clamping jaw is provided with a workpiece clamp with a V-shaped cross-section in the region of the V-shaped workpiece holder, the cross-sectional geometry of the V-shaped workpiece holder and the V-shaped workpiece clamp being configured essentially symmetrically relative to the conveying plane or symmetrically relative to a horizontal plane.

The advantage here is that the rod-shaped workpiece is positioned precisely in the clamping device in relation to its position. This precise positioning is also achieved if the rod-shaped workpiece deviates from a straight line along its longitudinal axis, as the end region of the rod-shaped workpiece can still be positioned and clamped or held in the correct position in the V-shaped workpiece holder by means of the V-shaped workpiece clamp.

According to one embodiment, it is possible that the upper clamping jaw is at least partially complementary in shape to the lower clamping jaw, the upper clamping jaw having a clamping surface which is convex or V-shaped in cross-section in the region of the V-shaped workpiece holder.

The system is therefore compatible with a wide range of rod-shaped workpieces with different diameters. If, for example, a rod-shaped workpiece has a diameter larger than the recess of the V-shaped tool holder in the direction of the first direction of movement, the rod-shaped workpiece can be held by the upper clamping jaw anyway. If, for example, a rod-shaped workpiece has a diameter smaller than the recess of the V-shaped tool holder in the direction of the first direction of movement, the rod-shaped workpiece can still be held by means of the V-shaped or convex clamping surface. At the same time, this configuration of the clamping jaws has the advantage, particularly with round workpieces, that the round workpiece is held by the clamping jaws by means of three contact points and thus in a statically defined manner.

This means that individual components of the system, such as the clamping jaws, do not need to be changed for rod-shaped workpieces with different diameters. Furthermore, it is not necessary to re-measure the different rod-shaped workpieces. It is sufficient to store the geometry of the rod-shaped workpiece to be processed once in order to be able to subsequently carry out the processing of the same in an effective and precise manner. Since the setup time for small batches is a considerable cost factor, the configuration of the system according to the invention provides further economic advantages.

Furthermore, it may be useful if the respective workpiece holder is symmetrical with respect to a vertical of symmetry plane, wherein a chamfering device is assigned to each workpiece holder of the system and wherein the processing rotation axis of the assigned chamfering device lies in the vertical symmetry plane of the respective workpiece holder.

This results in a precise positioning of rod-shaped workpieces regardless of their diameter. Furthermore, there is no need to store geometry values of the rod-shaped workpieces and associated positioning values of the clamping devices and the tool units, as the processing rotation axes of the chamfering devices are always aligned with the respective longitudinal axis of the rod-shaped workpiece. This reduces the complexity of the control of the system control and ensures and improves the precise processing of the rod-shaped workpieces. Particularly with rod-shaped workpieces with a small diameter, the application of a precisely manufactured chamfer is difficult to achieve without auxiliary measuring equipment. The embodiment in question improves the quality of the chamfer applied to rod-shaped workpieces with a small diameter in terms of low deviation tolerances.

Furthermore, it may be provided that the clamping device of the first processing device and the clamping device of the second processing device and, in particular, the respective lower clamping jaw and the respective upper clamping jaw are movable and positionable in a motion-coupled manner relative to the first and second machine frame in the direction along the first processing direction.

As a result, the at least one rod-shaped workpiece can be picked up by the conveying device, which is positioned in the correct position in the conveying direction by the V-shaped holder and is positioned in a position corresponding to the processing unit in the normal direction to the conveying direction thanks to the adjustability via the height adjustment. The motion coupling also ensures that the rod-shaped workpiece can be picked up simultaneously at both processing devices and thus at the first end portion and the second end portion in order to prevent or at least reduce bending or distortion of the rod-shaped workpiece.

Furthermore, it may be expedient for the respective clamping device to be movable and positionable relative to the machine frame of the respective processing device in the direction along the first processing direction, the respective first end region and the respective second end region, or the first and the second end portion of the at least one rod-shaped workpiece and of a second rod-shaped workpiece being receivable or positionable simultaneously in the respective clamping device of the first processing device and of the second processing device. This results in a further reduction in the necessary movements of the system components and consequently a further increase in the cycle frequency. These advantages are particularly enhanced by high quantities of rod-shaped workpieces.

Furthermore, it may be expedient for the conveying device to have at least two transport components, which at least two transport components each have two or more transport receptacles trough-shaped in cross-section, wherein the trough-shaped transport receptacles are lined up in the conveying direction and wherein the at least one rod-shaped workpiece can be positioned freely movable in the conveying direction in a respective trough-shaped transport receptacle of each transport component.

According to an expedient advancement, it may be provided that the first and second conveying means each have two or more transport receptacles trough-shaped in cross-section, wherein the trough-shaped transport receptacles are lined up in the conveying direction and wherein the at least one rod-shaped workpiece can be positioned in a freely movable configuration in the conveying direction in a respective trough-shaped transport receptacle of the first and second conveying means.

The at least one rod-shaped workpiece is thus freely movable in the trough-shaped transport receptacles in the conveying direction when the same is supplied to the first and second processing device, so that when the at least one rod-shaped workpiece is picked up by means of the respective clamping device or by means of the respective at least one lower clamping jaw of the first and second processing device, the at least one rod-shaped workpiece can be positioned in the V-shaped workpiece receptacles without tension. As a result, the conveying device in the conveying direction has a margin for minor inaccuracies when supplying rod-shaped workpieces to the first and second processing devices, which saves on complex measuring and control technology, while at the same time maintaining the high quality of the finishing accuracy of the chamfers on the rod-shaped workpieces.

The invention further relates to a processing method for simultaneously processing a first end and a second end of at least one rod-shaped workpiece by means of a system comprising a conveying device, a first processing device and a second processing device. The first processing device and the second processing device each are provided with a clamping device and a tool unit, which tool units each have at least one chamfering device in a machine housing and a sawing device.

The processing method comprises the following steps:

Positioning the at least one rod-shaped workpiece in a conveying plane of the conveying device transversely to a conveying direction. This means that the at least one rod-shaped workpiece or rod-shaped workpieces can be conveyed with their longitudinal axis aligned transversely to the conveying direction.

Simultaneously supplying a first end of the at least one rod-shaped workpiece to the first processing device and a second end of the at least one rod-shaped workpiece to the second processing device by means of the conveying device.

Positioning a first end region and a second end region of the at least one rod-shaped workpiece in the respective clamping device of the first processing device and the second processing device. The positioning of the first end region and the second end region, or the first end portion and the second end portion, may be achieved, for example, by simultaneously picking up the at least one rod-shaped workpiece from the conveying device by means of the clamping device. The clamping device may be picked up by moving it along a normal to the conveying plane.

Holding the first and second end regions or the first and second end portions of the at least one rod-shaped workpiece in each case by means of a lower clamping jaw and an upper clamping jaw of the respective clamping device, the at least one rod-shaped workpiece being positioned in the clamping device between the lower and the upper clamping jaw. For example, the lower clamping jaw or the upper clamping jaw can be moved in the direction along a normal to the conveying plane in order to hold the at least one rod-shaped workpiece between the lower and upper clamping jaws.

Cutting off a first end portion and a second end portion, or a first end and a second end, of the at least one rod-shaped workpiece by means of the respective sawing device of the first processing device and the second processing device. Preferably, the first end region and the second end region can be cut off simultaneously by the sawing devices of the first and second processing devices.

Machining for applying at least one chamfer to the first end and the second end of the at least one rod-shaped workpiece in each case by means of the at least one chamfering device of the first processing device and the second processing device. The chamfering, or the application of a chamfer at the first end and at the second end of the at least one rod-shaped workpiece, may preferably be carried out by advancing the respective chamfering device of the first and the second processing device in the direction along the longitudinal axis of the at least one rod-shaped workpiece, or in the direction transverse to the conveying direction.

The processing process is also characterized by the fact that the sawing device and the machine housing of the at least one chamfering device are moved as a motion-coupled tool unit. Thus, when the respective tool unit of the first and second processing device moves along a first processing direction aligned normal to the conveying plane, the first end portion and the second end portion of the at least one rod-shaped workpiece are cut by means of the respective sawing units in operation.

Furthermore, the at least one chamfer is applied at the first end and at the second end of the at least one rod-shaped workpiece by means of the respective chamfering devices in operation during movement of the respective tool unit along a second processing direction aligned orthogonal to the conveying direction and parallel to the conveying plane.

In the processing method in question, it is advantageous that two successive processing steps are carried out when processing the at least one rod-shaped workpiece or rod-shaped workpieces, whereas the respective at least one rod-shaped workpiece or the rod-shaped workpieces are clamped or held by the clamping device only once for both processing steps. Furthermore, it is advantageous that the processing operations are carried out by means of movements of a tool unit in the first and second processing device. This eliminates the need for extensive measuring requirements to maintain all tolerances when processing the rod-shaped workpieces, as the tool unit has a defined position relative to the clamping device and subsequently to the rod-shaped workpiece at all times. This results in a significant reduction in the cycle time per rod-shaped workpiece to be machined while at the same time increasing finishing accuracy compared to known state-of-the-art systems.

Furthermore, it may be expedient for the respective first end portion and the respective second end portion of two rod-shaped workpieces to be cut simultaneously by means of the respective sawing device. This results in a further reduction in the cycle time per rod-shaped workpiece and an increased cycle frequency. This embodiment also results in a lower energy consumption per rod-shaped workpiece to be processed due to the reduction in movement sequences compared to a sawing unit that only cuts one rod-shaped workpiece at a time.

Another advantageous embodiment is one according to which it may be provided that the first processing device and the second processing device each have two chamfering devices, which two chamfering devices are arranged spaced apart along the conveying direction, the respective first end and the respective second end of two rod-shaped workpieces being machined simultaneously by means of the two chamfering devices. Advantageously, the cycle time per rod-shaped workpiece to be processed is reduced. The system works more efficiently in terms of energy in turn, as individual movement sequences are reduced by the simultaneous advancements of two chamfering devices per rod-shaped workpiece to be processed.

For the purpose of better understanding of the invention, this will be elucidated in more detail by means of the figures below.

Figure 2:
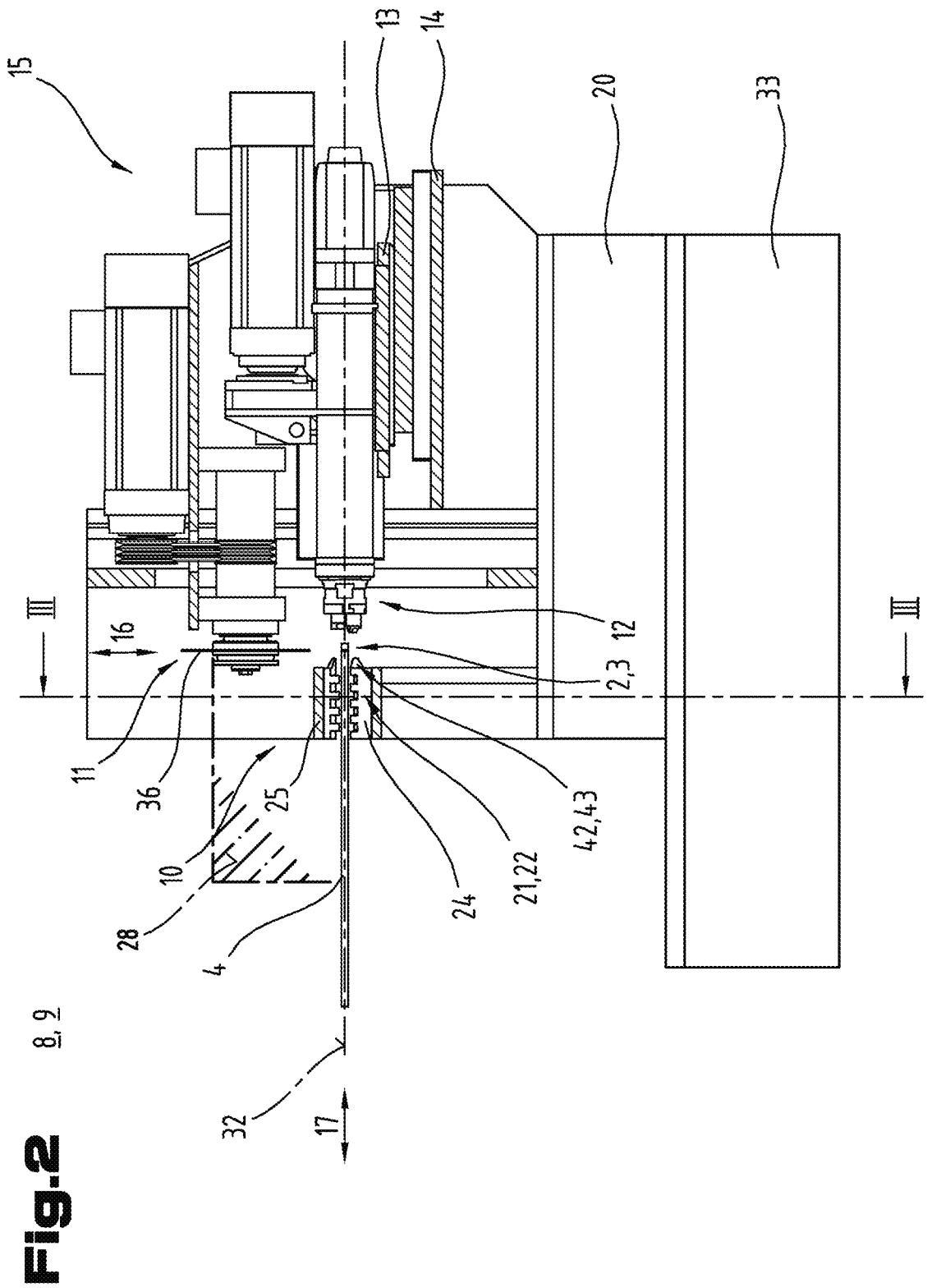
Figure 5:
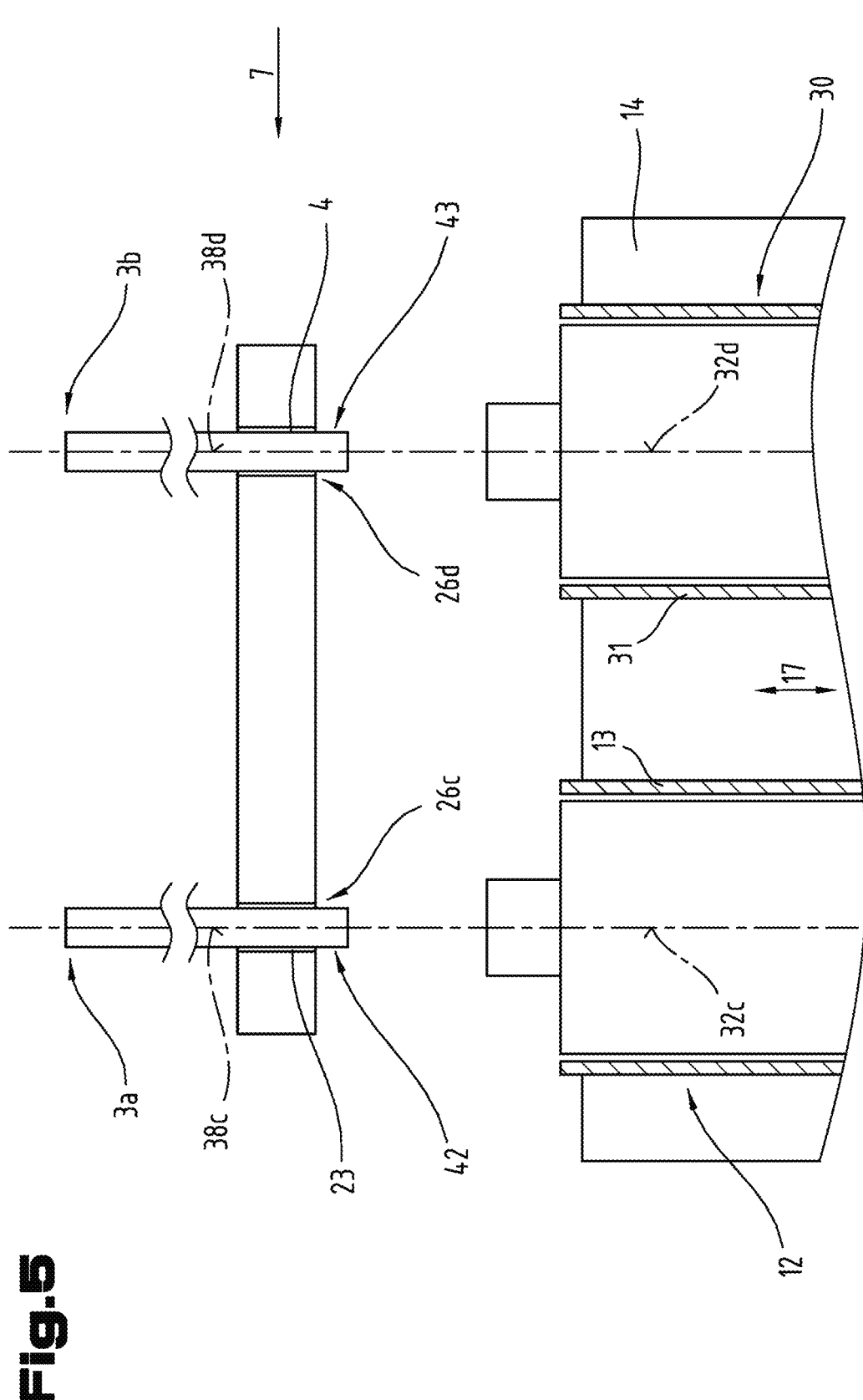
Figure 6:
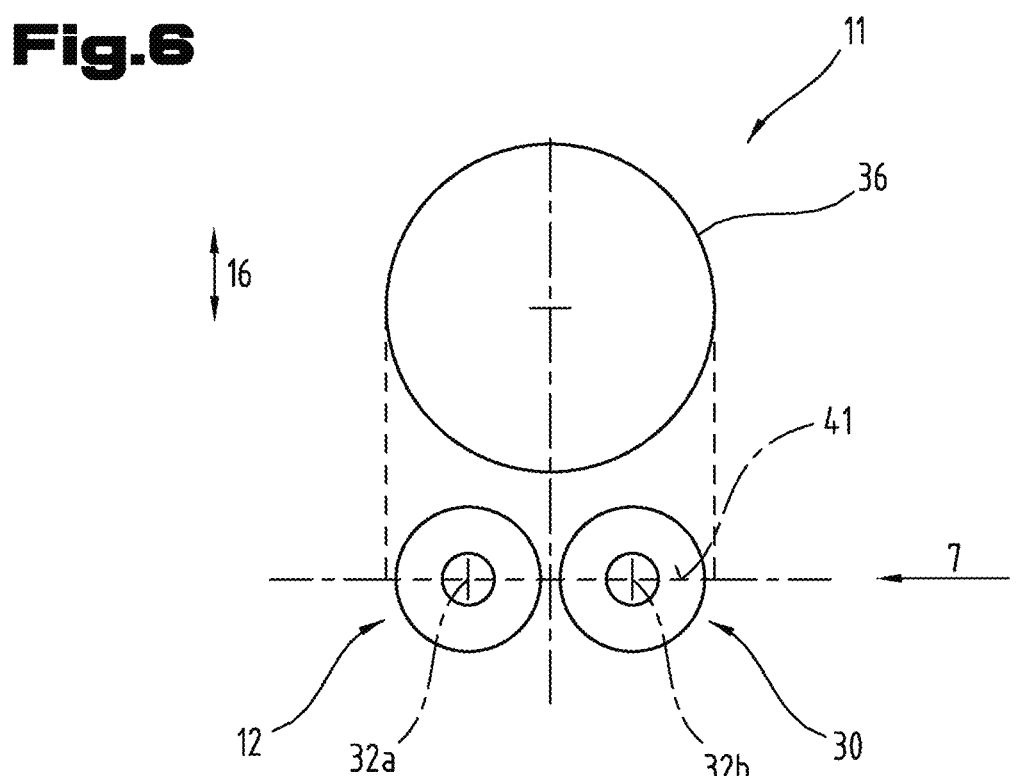

These show respectively in a simplified, schematic and exemplary representation:

FIG. 1 a possible configuration of the system for end processing of rod-shaped or tubular workpieces;

FIG. 2 a possible configuration of a processing device;

FIG. 3 the lower clamping jaw and the upper clamping jaw of the clamping device in cross-section;

FIG. 4 the first end region or the second end region of a rod-shaped workpiece;

FIG. 5 a first chamfering device and a second chamfering device on their joint support element of a tool unit;

FIG. 6 an arrangement of the sawing device, the at least one first chamfering device and the second chamfering device.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Furthermore, it should be noted that terms from the reference signs list are used in the description of the disclosure with and/or without a specific index in accordance with the reference signs list. If it is not necessary to differentiate between the terms in terms of their specific form or position, no indices are used. Conversely, for example, a chamfering device 12*a* is differentiated from a chamfering device 12*b* according to the respective description, wherein both are still chamfering devices 12.

FIG. 1 shows a possibly independent configuration of the system 1 for end processing of rod-shaped or tubular workpieces. In particular, the system 1 is used for processing a first end 2 and a second end 3 of at least one rod-shaped workpiece 4, wherein the processing of the two ends 2, 3 can be carried out simultaneously for the at least one rod-shaped workpiece 4 on the first processing device 8 and second processing device 9 provided for this purpose. The system 1 comprises a conveying device 5 in which the at least one rod-shaped workpiece 4 can be positioned in a conveying plane 6 transverse to the conveying direction 7. The rod-shaped workpiece 4 may preferably be aligned in such a way that the first end 2 and the second end 3 are simultaneously supplied to the respective processing devices 8, 9 by means of the conveying device 5, so that the at least one rod-shaped workpiece 4 is positioned correctly for the subsequent processing.

The conveying device 5 may comprise several transport components 35 in order to support the rod-shaped workpieces 4, particularly in the case of rod-shaped workpieces 4 with a length dimension that is a multiple of the mean diameter of a workpiece, in order to limit their deflection due to their own gravity. This can furthermore ensure that the ends 2, 3, or a first end region 21 and a second end region 22 of the at least one rod-shaped workpiece 4 are supplied to the first processing device 8 and the second processing device 9 in the correct position, that is, if possible along their longitudinal axis without deflection and with their longitudinal axis within the conveying plane 6.

Furthermore, the first processing device 8 comprises a first conveying means 18 and the second processing device 9 comprises a second conveying means 19, which first conveying means 18 is arranged on a first machine frame 20*a* and which second conveying means 19 is arranged on a second machine frame 20*b* of the processing devices 8, 9 and is motion-coupled or can be controlled to move in the same way. By means of the conveying means 18, 19, it can be ensured that supplying the at least one rod-shaped workpiece 4, or supplying rod-shaped workpieces, is ensured in the correct position in the direction of the conveying direction 7. Supplying the rod-shaped workpieces in the correct position in the direction of conveying 7 is particularly important, as the processing devices 8, 9 each comprise machines for precise processing of the end regions or the ends of the rod-shaped workpieces.

In order to be able to process the at least one rod-shaped workpiece 4 effectively and precisely, the first processing device 8 and the second processing device 9 each comprise a clamping device 10, a sawing device 11 and at least one chamfering device 12, which chamfering device 12 is arranged in a machine housing 13. The sawing device 11 and the machine housing 13 are arranged rigidly movement-coupled relative to each other on a joint support element 14 and thus form a tool unit 15 for each processing unit 8 or 9 together with the joint support element 14. The tool unit 15*a* of the first processing device 8 and the tool unit 15*b* of the second processing device 9 are each movable relative to a respective first and second machine frame 20*a*, 20*b* along a first processing direction 16 aligned normal to the conveying plane 6 and along a second processing direction 17 aligned orthogonal to the conveying direction 7 and parallel to the conveying plane 6.

Furthermore, the processing devices 8, 9 each comprise a clamping device 10 by means of which the at least one rod-shaped workpiece 4 can be positioned and held. For example, it is possible that at least one rod-shaped workpiece 4 or two rod-shaped workpieces 4, 23 or several rod-shaped workpieces are supplied to the processing devices 8, 9 by means of the conveying device 5 in such a way that the respective end regions are positioned in the clamping devices 10*a*, 10*b*. The respective end regions are then held by the clamping devices 10*a*, 10*b* so that the end regions or the ends of the rod-shaped workpieces can be processed.

The at least one rod-shaped workpiece 4 or the rod-shaped workpieces are processed by means of the respective sawing device 11 and the chamfering device 12 of the processing devices 8, 9. In this case, the ends of the rod-shaped workpiece 4 or the rod-shaped workpieces are first cut by the operating sawing device 11 when the tool unit 15 is advancing in the direction along the first processing direction 16. It is therefore possible to cut several rod-shaped workpieces in this one processing step in addition to cutting one rod-shaped workpiece 4. To ensure this, the sawing device 11 is arranged in coordination with the clamping device 10 in such a way that the cutting width of the sawing device 11 covers the rod-shaped workpieces to be cut or their end regions. If there is a plurality of workpieces to be cut at the same time, it is conceivable that a saw blade 36 with a correspondingly large diameter or a band saw blade can be used. At the same time, it can be noted that the diameter of the saw blade 36 of the sawing device 11 in combination with the arrangement of the sawing device 11 on the joint support element 14 and the clamping device 10 is selected such that a collision of the sawing device 11 with the clamping device 10 is avoided when the tool unit 15 moves along the first direction of movement 16.

In a second processing step, a chamfer 34 (see FIG. 5*a*, FIG. 5*b*) is applied to the cut rod-shaped workpiece 4 through machining by means of the chamfering device 12 in operation while the tool unit 15 is moving in the direction along the second processing direction 17.

The first processing device 8 and the second processing device 9 are mounted on a joint base frame 33 in a fixed position by means of the respective first and second machine frames 20*a*, 20*b*. Furthermore, the transport components 35 can be mounted on the joint base frame 33. By holding the processing devices 8, 9 in place, they are fixed in position in relation to each other, allowing the rod-shaped workpieces to be cut to their intended length. It is therefore possible for the rod-shaped workpieces to be cut to length or their end regions to be trimmed without additional measuring technology in accordance with an intended length value resulting from the positioning of the processing devices 8, 9 relative to one another. At the same time, the intended length of the rod-shaped workpieces may be slightly influenced or changed by the movability of the respective tool unit 15*a*, 15*b* of the processing devices 8, 9 along the second direction of movement 17. Furthermore, it is provided that a processing rotation axis 32*a* of the at least one chamfering device 12*a* is aligned with a processing rotation axis 32*b* of the at least one chamfering device 12*b* by the arrangement of the two processing devices 8, 9 on the joint base frame 33.

Furthermore, it is provided that the conveying device 5, or the first conveying means 18, the second conveying means 19 and possibly the transport components 35, have trough-shaped transport receptacles 29. These trough-shaped transport receptacles 29 are provided for receiving rod-shaped workpieces 4, 23, wherein preferably at least six rod-shaped workpieces can be simultaneously received by the conveying device 5 by means of the trough-shaped transport receptacles 29 and transported in the conveying direction 7. It is provided that a single rod-shaped workpiece 4 can be received in each of the trough-shaped transport receptacles 29, which are arranged in alignment with one another transversely to the conveying direction 5. It is possible that, in addition to the first conveying means 18 and the second conveying means 19, the transport components 35 are also movement-coupled, or that the conveying means 18 and the transport components 35 are controlled in a coordinated manner in their movement, so that the rod-shaped workpieces can be supplied to the processing devices 8, 9 in the correct position according to their longitudinal axis.

Further, the rod-shaped workpieces 4, 23 are positioned movably in the trough-shaped transport receptacles 29 in the conveying direction 7, or the rod-shaped workpieces 4, 23 have at least a range of movement of a length of up to two mean diameters of a rod-shaped workpiece 4 in the trough-shaped transport receptacles 29 in the direction along the conveying direction 7, or the rod-shaped workpieces 4, 23 are not fixed or held in the trough-shaped transport receptacles 29 in the direction of the conveying direction 7. It is thus possible to use the respective clamping devices 10*a*, 10*b* of the processing devices 8, 9 to precisely position the rod-shaped workpieces to be processed relative to the respective processing device 8, 9 without tension, since the rod-shaped workpieces are positioned in the trough-shaped transport receptacles 29 so that they can move in the direction along the conveying direction 7.

FIG. 2 shows a further and possibly independent embodiment of the processing device 8 or 9, again using the same reference signs or component designations for the same parts as in the preceding FIG. 1. In order to avoid unnecessary repetition, reference is made to the detailed description in the preceding FIG. 1.

The clamping device 10 is mounted on the machine frame 20 and comprises a lower clamping jaw 24 and an upper clamping jaw 25 in relation to the conveying plane 6, which are movable in the vertical direction or in the direction of the first direction of movement 16. If a rod-shaped workpiece 4 or its first or second end region 21 or 22 is conveyed to the respective processing device 8 or 9, it is possible for the rod-shaped workpiece 4 to be picked up by means of the lower clamping jaw 24. The rod-shaped workpiece 4 can be picked up by moving the lower clamping jaw 24 in a vertical direction. Subsequently, the rod-shaped workpiece 24 can be held by the upper clamping jaw 25 so that it can then be precisely machined.

As shown in FIG. 2, the saw blade 36 can have such dimensions that no collision of the saw blade 36 is possible when moving in the direction of the second direction of movement 17, or the sawing device 11 is arranged on the joint support element 14 in such a way that, when the tool unit 15 moves in the direction of the second processing direction 17, there is a free space between the clamping device 10, or the upper clamping jaw 25 of the clamping device 10, and the saw blade 36, or the sawing device 11, so that processing of the end 2 or 3 or the first end region 21 or the second end region 22 is possible. Furthermore, the positioning of the sawing device 11 on the joint support element 14 may be selected such that there is a free space between the clamping device 10 and the sawing device 11 when the at least one rod-shaped element 4 is cut, so that no collision between components of the tool unit 15 and other machine components is possible.

Furthermore, it may be provided that the chamfering device 12 can be moved relative to its machine housing 13 in the direction of the second processing direction 17. This measure provides an extended processing region for the tool unit 15, while at the same time reducing the processing path of the tool unit 15 when the entire tool unit 15 is advanced.

FIG. 3, or FIG. 3*a*, FIG. 3*b* and FIG. 3*c*, show three independent embodiments of the lower clamping jaw 24 and the upper clamping jaw 25 of the clamping device 10, again using the same reference signs or component designations for the same parts as in the preceding views. The lower clamping jaw 24 has a V-shaped workpiece holder 26 projected onto a cross-sectional surface 39. The workpiece holder 26 is aligned in such a way that a rod-shaped workpiece 4 can be accommodated therein, wherein a workpiece longitudinal axis 38 can be aligned normal to the cross-sectional surface 39 and the rod-shaped workpiece 4 can be positioned and held in the conveying direction 7 by means of the contact flanks 37*a*, 37*b* forming the V-shaped workpiece holder 26.

Figures 3A, 3B, 3C:
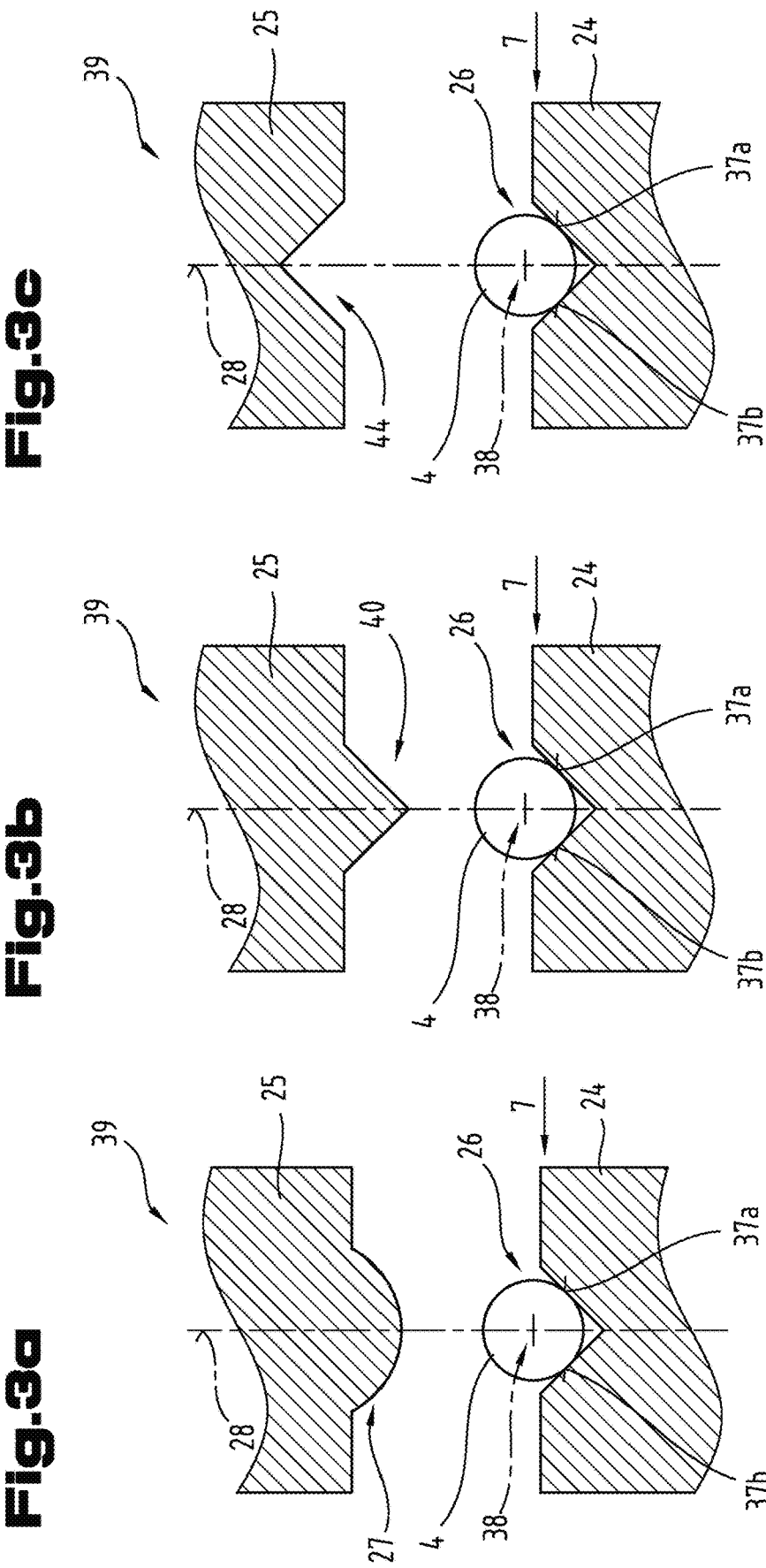

The upper clamping jaw 25 may be at least partially supplementary, or complementary in shape, to the lower clamping jaw 24. As shown in FIG. 3*a*, a convex curvature projected onto the cross-sectional surface 39 may be formed as a clamping surface 27 in the area of the workpiece holder 26. If the upper clamping jaw 24 is moved towards the upper clamping jaw 25, or vice versa, the rod-shaped workpiece 4 inserted into the workpiece holder 26 is held in the workpiece holder 26 by means of the clamping surface 27. This essentially creates a statically determined holding of the corresponding end region of a rod-shaped workpiece 4 by means of the three points of contact between the lower clamping jaw 24, upper clamping jaw 25 and the rod-shaped workpiece 4.

It is possible and advantageous if the workpiece holder 26 is symmetrical in relation to a vertical symmetry plane 28. Thus, the workpiece longitudinal axis 38 of the rod-shaped workpiece 4 positioned in the workpiece holder 26 lies in the symmetry plane 28, wherein the position with respect to the conveying direction 5 of the rod-shaped workpiece 4 is fixed.

It is possible that the upper clamping jaw 25 is configured at least partially complementary in shape to the lower clamping jaw 24, wherein, as shown in FIG. 3*b*, a V-shaped but complementary clamping cutting edge 40 can be formed in the area of the workpiece holder 26. It is possible that the geometry of the flanks forming the clamping cutting edge 40, which are V-shaped in cross-section, have a flatter angle to a horizontal than the contact flanks 37*a*, 37*b*. This essentially results in a statically determined holding of the corresponding end region of a rod-shaped workpiece 4 by means of the three points of contact between the lower clamping jaw 24, upper clamping jaw 25 and the rod-shaped workpiece 4.

Both possible embodiments of the upper clamping jaw 25 have the advantageous effect that rod-shaped workpieces 4 with different mean diameters can be picked up and clamped by means of the clamping device 10. For example, a rod-shaped workpiece 4 with an mean diameter that is smaller than the clear depth of the workpiece holder 26 can be held in the clamping device 10 by means of the convex clamping surface 27 or by means of the clamping cutting edge 40.

Furthermore, an advantageous embodiment can provide that the upper clamping jaw 25 has a workpiece clamp 44 with a V-shaped cross-section with respect to its basic shape. In this case, the V-shaped workpiece clamp 44 can have essentially the same or similar cross-sectional shape as the V-shaped workpiece holder 26 with respect to its basic shape, mirrored in cross-section and in relation to a horizontal plane or to the conveying plane 6. Essentially, the lower clamping jaw 24 and the upper clamping jaw 25 can thus each have a recess for receiving or clamping the at least one rod-shaped workpiece 4, the respective recesses being aligned opposite one another.

Figure 4A:
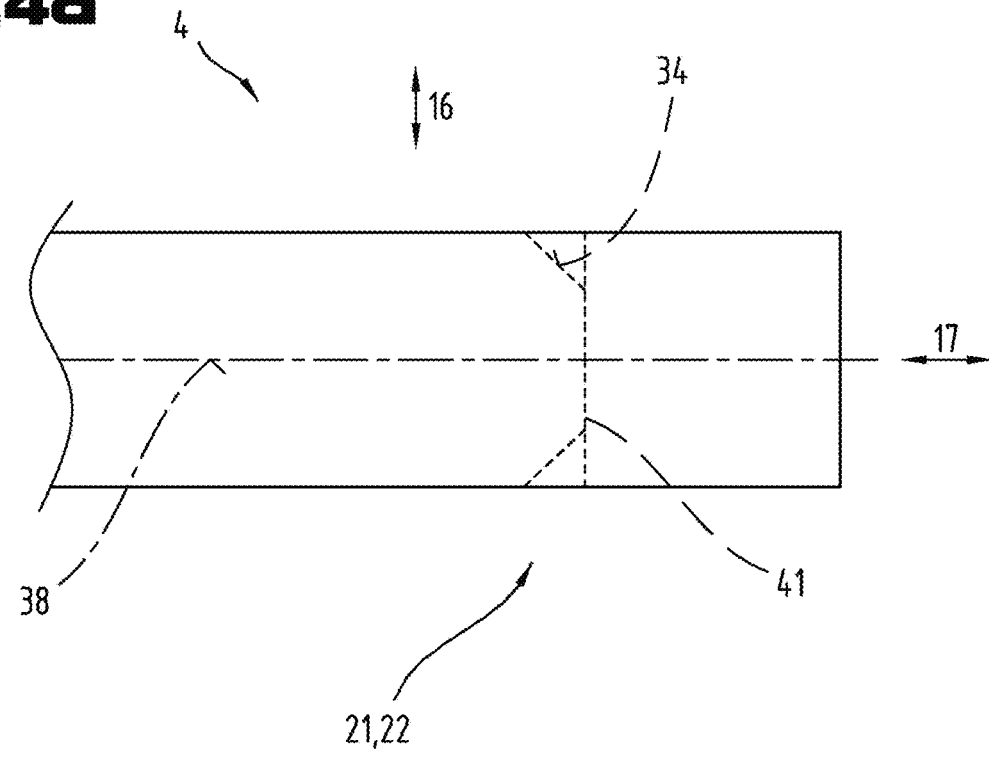
Figure 4B:
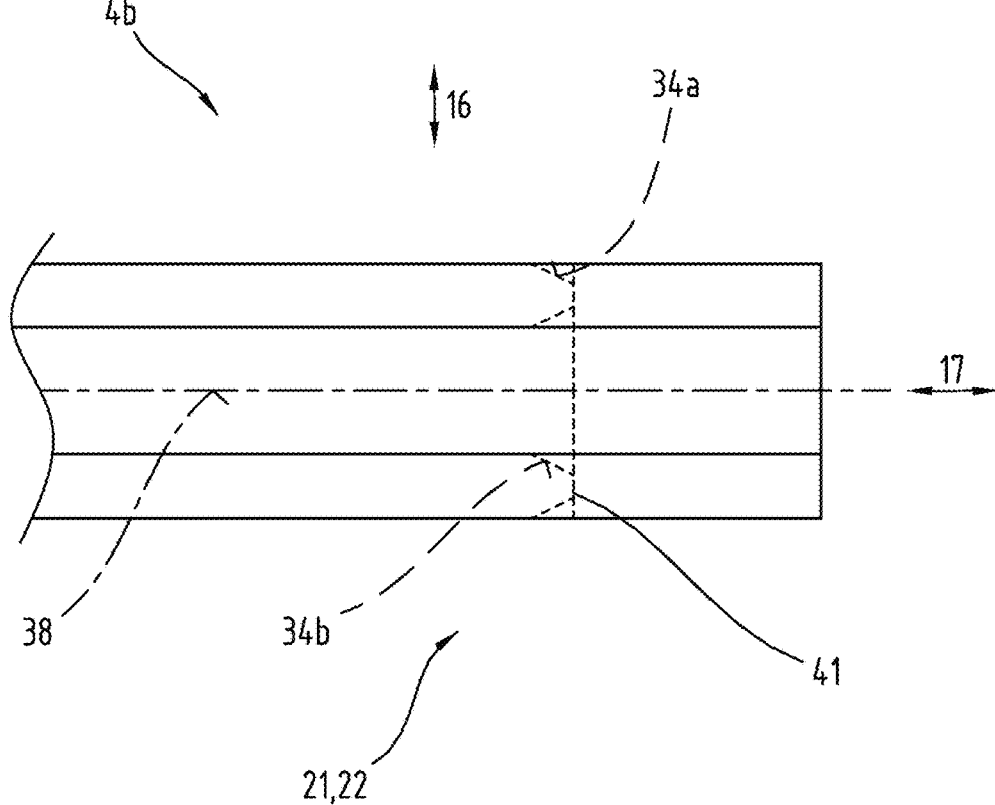

For a better understanding, FIG. 4, or FIG. 4a and FIG. 4b, show the first end region 21 or the second end region 22 of a rod-shaped workpiece 4, again using the same reference signs or component designations for the same parts as in the preceding views. It is possible for the at least one rod-shaped workpiece 4 to be further processed in various ways along a cutting line 41 with the at least one chamfering device 12 after being cut. The chamfering device 12 can be a rotating and machining processing machine. Thus, in addition to chamfer 34 or 34a, which is an external chamfer in relation to the rod-shaped workpiece 4, it is also possible to apply a chamfer 34b as an internal chamfer to a tubular workpiece 4b, for example.

FIG. 5 shows a further and possibly independent embodiment of a first chamfering device 12 and a second chamfering device 31 on their joint supporting element 14 of a tool unit 15, again using the same reference signs or component designations for the same parts as in the preceding views. As shown, a tool unit 15 may comprise two chamfering devices 12, 31, both of which are held on the joint support element 14 by means of the machine housing 13 and the second machine housing 31. It may be advantageous that the positioning of the chamfering devices 12, 31 is arranged in such a way corresponding to the lower clamping jaw 24 or to the clamping device 10 that the vertical symmetry plane 28 of the respective workpiece holders 26c, 26d is aligned with the respective processing rotation axes 32c, 32d. As a result, the rod-shaped workpieces 4, 23 are positioned in such a way that the workpiece longitudinal axes 38c, 38d are aligned with the processing rotation axes 32c, 32d of the chamfering devices 12, 31 and a precise chamfer is applied to the rod-shaped workpieces simultaneously in one operation when the tool unit 15 moves in the direction of the second processing direction 17.

FIG. 6 shows a further and possibly independent embodiment of an arrangement of the sawing device 11, the at least one first chamfering device 12 and the second chamfering device 30, again using the same reference signs or component designations for the same parts as in the preceding views. FIG. 6 shows the at least one first chamfering device 12 and the second chamfering device 30 with their processing rotation axes 32a and 32b arranged at a distance along the conveying direction 7. Furthermore, the arrangement of the saw blade 36 of the sawing device 11 is shown, with the cutting line 41 of the sawing device 11 covering the at least one rod-shaped workpiece 4 and the second rod-shaped workpiece 23. This ensures that the respective first end portion 42 and the respective end portion 43 of both rod-shaped workpieces 4 and 23 (see FIG. 5) are cut when the tool unit 15 moves in the direction of the first processing direction 16.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

Finally, as a matter of form, it should be noted that for ease of understanding of the structure, elements are partially not depicted to scale and/or are enlarged and/or are reduced in size.

| List of reference signs | |
|---|---|
| 1 | system |
| 2 | first end |
| 3 | second end |
| 4 | rod-shaped workpiece |
| 5 | conveying device |
| 6 | conveying plane |
| 7 | conveying direction |
| 8 | first processing device |
| 9 | second processing device |
| 10 | clamping device |
| 11 | sawing device |
| 12 | chamfering device |
| 13 | machine housing |
| 14 | joint support element |
| 15 | tool unit |
| 16 | first processing direction |
| 17 | second processing direction |
| 18 | first conveying means |
| 19 | second conveying means |
| 20 | machine frame |
| 21 | first end region |
| 22 | second end region |
| 23 | second rod-shaped workpiece |
| 24 | lower clamping jaw |
| 25 | upper clamping jaw |
| 26 | workpiece holder |
| 27 | clamping surface |
| 28 | vertical symmetry plane |
| 29 | trough-shaped transport holder |
| 30 | second chamfering device |
| 31 | second machine housing |
| 32 | processing rotation axis |
| 33 | joint baseframe |
| 34 | chamfering device |
| 35 | trasport component |
| 36 | saw blade |
| 37 | contact flank |
| 38 | workpiece longitudinal axis |
| 39 | cross-sectional area |
| 40 | clamping cutting edge |
| 41 | cutting line |
| 42 | first end portion |
| 43 | second end portion |
| 44 | workpiece clamp |

The invention claimed is:

1. A system (1) for processing a first end (2) and a second end (3) of at least one rod-shaped workpiece (4), comprising a conveying device (5) in which the at least one rod-shaped workpiece (4) can be positioned in a conveying plane (6) transversely to a conveying direction (7) and by means of which conveying device (5) the at least one rod-shaped workpiece (4) can be conveyed in the conveying direction (7), a first processing device (8) and a second processing device (9), wherein, by means of the conveying device (5), the first end (2) of the at least one rod-shaped workpiece (4) can be supplied to the first processing device (8) and the second end (3) of the at least one rod-shaped workpiece (4) can be supplied to the second processing device (9), the first processing device (8) and the second processing device (9) each having a clamping device (10a, 10b), a sawing device (11a, 11b) and at least one chamfering device (12a, 12b), wherein in the first processing device (8) and in the second processing device (9), in each case the sawing device (11) and a machine housing (13) of the at least one chamfering device (12) are arranged on a joint support element (14) and are held in a fixed position relative to the joint support element (14), wherein, in the first processing device (8) and in the second processing device (9), the sawing device (11), the machine housing (13) with the at least one chamfering device (12) and the joint support element (14) each form a first tool unit (15a) and a second tool unit (15b), wherein the first tool unit (15a) of the first processing device (8) is movable relative to a first machine frame (20a) and the second tool unit (15b) of the second processing device (9) is movable relative to a second machine frame (20b) along a first processing direction (16) aligned normal to the conveying plane (6) and along a second processing direction (17) aligned orthogonal to the conveying direction (7) and parallel to the conveying plane (6), and wherein the respective clamping device (10a, 10b) is movable and positionable relative to the first and second machine frame (20a, 20b) of the respective processing device (8, 9) along the first processing direction (16), a first end region (21) and a second end region (22) of the at least one rod-shaped workpiece (4) being receivable or positionable in the respective clamping device (10a, 10b) of the first processing device (8) and of the second processing device (9).

2. The system according to claim 1, wherein the conveying device (5), the first processing device (8) and the second processing device (9) are mounted on a joint baseframe (33), a processing rotation axis (32a) of the at least one chamfering device (12a) of the first processing device (8) being aligned with a processing rotation axis (32b) of the at least one chamfering device (12b) of the second processing device (9).

3. The system according to claim 1, wherein the conveying device (5) comprises a first conveying means (18) and a second conveying means (19), wherein the first conveying means (18) is mounted on the first machine frame (20a) of the first processing device (8) and wherein the second conveying means (19) is mounted on the second machine frame (20b) of the second processing device (9), wherein the first conveying means (18) and the second conveying means (19) are motion-coupled.

4. The system according to claim 1, wherein the respective tool unit (15a, 15b) of the first processing device (8) and of the second processing device (9) comprises, in addition to the at least one chamfering device (12), at least one second chamfering device (30) with a second machine housing (31), the machine housings (13, 31) of the at least one chamfering device (12) and of the at least one second chamfering device (30) being arranged at a distance from one another on the joint support element (14) along the conveying direction (7).

5. The system according to claim 4, wherein the at least one chamfering device (12) is movable and positionable in a motion-coupled manner relative to its machine housing (13) and the second chamfering device (30) is movable and positionable in a motion-coupled manner relative to its second machine housing (31), each in the direction along the second processing direction (17).

6. The system according to claim 1, wherein the first end (2) and the second end (3) of the at least one first rod-shaped workpiece (4) and of a second rod-shaped workpiece (23) can be cut by means of the respective sawing device (11a, 11b) of the first processing device (8) and of the second processing device (9) during a movement of the tool unit (15) along the first processing direction (16).

7. The system according to claim 1, wherein the clamping device (10a) of the first processing device (8) and the clamping device (10b) of the second processing device (9) each have a lower clamping jaw (24) and an upper clamping jaw (25) relative to the conveying plane (6), at least one workpiece holder (26) with a V-shaped cross-section being formed in the lower clamping jaw (24) for the at least one rod-shaped workpiece (4).

8. The system according to claim 7, wherein the upper clamping jaw (25) has a workpiece clamp (44) with a V-shaped cross-section in the region of the V-shaped workpiece holder (26), the cross-sectional geometry of the V-shaped workpiece holder (26) and the V-shaped workpiece clamp (44) being configured essentially symmetrically relative to the conveying plane (6) or symmetrically relative to a horizontal plane.

9. The system according to claim 7, wherein the upper clamping jaw (25) is at least partially complementary in shape to the lower clamping jaw (24), the upper clamping jaw (25) having a clamping surface (27) which is convex or V-shaped in cross-section in the region of the V-shaped workpiece holder (26).

10. The system according to claim 7, wherein the respective workpiece holder (26) is configured symmetrically relative to a vertical symmetry plane (28), wherein a chamfering device (12) is assigned to each workpiece holder (26) of the system (1) and wherein the processing rotation axis (32) of the assigned chamfering device (12) lies in the vertical symmetry plane (28) of the respective workpiece holder (26).

11. The system according to claim 1, wherein the clamping device (10a) of the first processing device (8) and the clamping device (10b) of the second processing device (9) are movable and positionable in a movement-coupled manner relative to the first and second machine frame (20a, 20b) in the direction along the first processing direction (16).

12. The system according to claim 1, wherein the conveying device (5) has at least two transport components (35), which wherein the at least two transport components (35) each have two or more transport holders (29) trough-shaped in cross-section, wherein the trough-shaped transport receptacles (29) are lined up in the conveying direction (7) and wherein the at least one rod-shaped workpiece (4) can be positioned in a freely movable configuration in the conveying direction (7) in a respective trough-shaped transport receptacle (29) of each transport component (35).

13. A processing method for simultaneously processing a first end (2) and a second end (3) of at least one rod-shaped workpiece (4) by means of a system (1), comprising a conveying device (5), a first processing device (8) and a second processing device (9), wherein the first processing device (8) and the second processing device (9) each have a clamping device (10*a*, 10*b*) and a tool unit (15*a*, 15*b*), which tool units (15*a*, 15*b*) each have at least one chamfering device (12) in a machine housing (13) and a sawing device (11), the processing method comprising the steps:

positioning the at least one rod-shaped workpiece (4) in a conveying plane (6) of the conveying device (5) transversely to a conveying direction (7);

simultaneously supplying the first end (2) of the at least one rod-shaped workpiece (4) to the first processing device (8) and the second end (3) of the at least one rod-shaped workpiece (4) to the second processing device (9) by means of the conveying device (5);

positioning a first end region (21) and a second end region (22) of the at least one rod-shaped workpiece (4) in the respective clamping device (10*a*, 10*b*) of the first processing device (8) and the second processing device (9);

holding the respective end regions (21, 22) of the at least one rod-shaped workpiece (4) in each case by means of a lower clamping jaw (24) and an upper clamping jaw (25) of the respective clamping device (10*a*, 10*b*);

cutting off a first end portion (42) and a second end portion (43) of the at least one rod-shaped workpiece (4) by means of the respective sawing device (11*a*, 11*b*) of the first processing device (8) and the second processing device (9);

machining for applying at least one chamfer (34) to the first end (2) and to the second end (3) of the at least one rod-shaped workpiece (4) in each case by means of the at least one chamfering device (12*a*, 12*b*) of the first processing device (8) and of the second processing device (9);

wherein the sawing device (11) and the machine housing (13) of the at least one chamfering device (12) are moved as a motion-coupled tool unit (15), wherein the respective tool unit is moved relative to a respective machine frame, wherein the first end portion (42) and the second end portion (43) of the at least one rod-shaped workpiece (4) are cut by means of the respective sawing units (11*a*, 11*b*) in operation during movement of the respective tool unit (15*a*, 15*b*) along a first processing direction (16) aligned normal to the conveying plane (6), wherein the at least one chamfer is applied to the first end (2) and to the second end (3) of the at least one rod-shaped workpiece (4) by means of the respective chamfering devices (12*a*, 12*b*) in operation during movement of the respective tool unit (15*a*, 15*b*) along a second processing direction (17) aligned orthogonal to the conveying direction (7) and parallel to the conveying plane (6), and where in the first end region and the second end region of the at least one rod-shaped workpiece is received by the conveying device and positioned at the respective processing device by moving or positioning of the clamping device relatively to the machine frame along the first processing direction.

14. The method according to claim 13, wherein the respective first end portion (42) and the respective second end portion (43) of two rod-shaped workpieces (4, 23) are cut simultaneously by means of the respective sawing device (11*a*, 11*b*).

15. The method according to claim 13, wherein the first processing device (8) and the second processing device (9) each have two chamfering devices (12*a*, 12*b*), which two chamfering devices (12*a*, 12*b*) are arranged spaced apart along the conveying direction (7), the respective first end (2) and the respective second end (3) of two rod-shaped workpieces (4, 23) being machined simultaneously by means of the respective two chamfering devices (12*a*, 12*b*).

* * * * *